UNITED STATES PATENT OFFICE.

OSCAR AUGUST HUBERT HUGO KÖSTERS, OF HEMELINGEN, NEAR BREMEN, GERMANY.

EMULSION OF OIL AND THE LIKE.

No. 875,665.      Specification of Letters Patent.      Patented Dec. 31, 1907.

Original application filed May 2, 1906, Serial No. 314,889. Divided and this application filed August 30, 1907. Serial No. 390,810.

*To all whom it may concern:*

Be it known that I, OSCAR AUGUST HUBERT HUGO KÖSTERS, citizen of the German Empire, residing at Hemelingen, near Bremen, Germany, have invented certain new and useful Improvements in Emulsions of Oil and the Like, being a division of my application filed May 2, 1906, Serial No. 314,889; and I do hereby declare the following to be a full, clear, and exact description of the invention, such as will enable others skilled in the art to which it appertains to make and use the same.

This invention relates to the preparation of permanent emulsions of oils, fats and the like with water, and has for its object the production of a homogeneous emulsion which shall remain stable when cold and also at boiling temperatures.

Many attempts have been made to emulsify oils, fats and fatty substances with water so as to produce fully homogeneous and stable emulsions. For this purpose the oil or fat has been mixed with various kinds of soap.

Another expedient has consisted in imparting to fats and fatty substances an increased tendency to take up water by mixing them with amids of the higher fatty acids or with acidyl derivatives or aromatic bases, the two being substantial equivalents for the purpose.

The emulsions made by aid of soaps have the disadvantage in practice that when the disadvantage in practice that when gently warmed or when mixed with glycerin or another substance which raises the specific gravity of water, the oil or fat separates from the water and remains separated.

When the emulsion is made by aid of substances which increase the tendency of the fat or the like to take up water, even when an impracticably high proportion of the substance is added, only about 20 per cent. of water can be incorporated with the fat, as above this limit a mere mixture of fat and water is formed.

The present invention relates to a manufacture of emulsions of fats or oils containing any desired percentage of water, which remain quite stable in the cold or at the boiling point of water and when mixed with glycerin, for example, so that the applicability of the emulsions is much extended.

The manufacture consists in boiling an amid of a higher fatty acid, for instance, an acidyl derivative of an aromatic base, such as the anilid of stearic acid, or the amid of stearic acid, with water and introducing into this mixture the oil or fat, which is to be emulsified, together with a salt of a higher fatty acid. By the introduction of the said salt the oil or fat, even at the boiling point of water, is emulsified completely and homogeneously with the anilid or amid mixture and on cooling, according to the degree of dilution, an emulsion is obtained having the consistency of an ointment, cream or milk and of permanent stability. The characteristic property of the emulsions produced in this manner as compared with all emulsions hitherto known, is that the stability of the emulsion is quite independent of the proportion of water present, which property has long been an object sought.

The following examples illustrate the process.

Example 1. To make a thick yellow colored emulsion from stearanilid and dark heavy cylinder oil, 300 grams of stearanilid are boiled with
240 " of the sodium salt of a fatty acid in
4,000 " of water; into the milky liquid thus obtained
2,000 " of heavy cylinder oil and
4,000 " of hot water are poured.

10,640 grams.

The whole mixture is then boiled, whereupon the mineral oil becomes homogeneously emulsified. The mass is stirred until cold, when it forms a thick viscid yellow substance containing about 20 per cent. of oil.

Example 2. If the directions given in the preceding example be followed with a substitution of 2000 grams of light colored lubricating oil for the dark cylinder oil, a similar product is obtained which is, however, white instead of yellow.

Example 3. The directions given in the preceding example may be followed with a substitution of 400 grams of stearamid for 300 grams of stearanilid.

As a part of the invention, the emulsions prepared by this process may be mixed with glycerin or another substance capable of raising the specific gravity of water. In this manner the good effect of glycerin in certain applications like the oiling of textile fibers, can be combined with the effect of the oil or fat.

Emulsions made according to this invention are applicable for all purposes for which emulsions are employed, for instance in the textile industries, in lubrication, and in pharmacy. They possess, in addition to the valuable properties of those emulsions already known, the following advantages:

*a.* They are entirely stable at a boiling heat, so that they find employment where former emulsions fell short, as, for instance, in the impregnation of textile fibers for the improvement of their spinning properties, the preparation of jute by subjection to heat, etc.

*b.* They readily take glycerin, and other substances which raise the specific gravity of water, without a separation of the constituent parts. This is of great advantage in the textile industry and has been for a long time unsuccessfully striven for, by reason of the fact that the glycerin insures a favorable condition of the fibers for spinning and improves the feel of the articles.

*c.* Furthermore, by the mixing of ammonium carbonate with the emulsion, a preservative is attained which, when used on the barrels of fire arms, avoids the injurious effect of nitro powders.

*d.* It adapts itself readily to the lubrication of moving parts of machinery, more or less exposed to heating, such as steam cylinders, as no hardening of the lubricant takes place.

*e.* The high degree of consistency of the emulsion makes the same valuable for the greasing of wool, because, on the one hand, the usual greasing apparatus in the spinning industry permits only viscid greasing substances to be employed, and, on the other hand, the emulsions of the present process are easily removable by washing and leave behind in the goods no greasy spots to affect the dyeing or detract from the appearance of the product.

*f.* The emulsions are entirely harmless, as the unsaponifiable and stable acidyl derivatives of the aromatic bases as also the amids of the higher fatty acids constitute entirely neutral bodies which are not subject to chemical decomposition.

*g.* These emulsions can be freely used, in the presence of different salts, for the treatment, without risk, of textiles which are later to come into contact with water containing lime and magnesia.

*h.* The lubricating effect of these emulsions is of a high order, as the acidyl derivatives of the aromatic bases as also the amids of the higher fatty acids possess in themselves a fatty character.

*i.* These emulsions are adapted, moreover, under suitable treatment, for use in medicine and in cosmetics.

*j.* Also in soap manufacture as well as in textile and paper printing these emulsions can be employed to advantage.

*k.* The manufacture is inexpensive as, of the active ingredients which in themselves are dear, but a small quantity is necessary—about 2% to 3% of the finished highly valuable emulsion.

*l.* Finally, the manner of manufacture is unusually simple, as a slight expenditure of heat and the most simple apparatus imaginable suffices.

Having thus fully described my invention, what I claim as new and desire to secure by Letters Patent is:—

1. The process of producing stable emulsions of oils, fats and the like, which consists in heating an acidyl derivative of an aromatic base and a salt of a higher fatty acid with water and the oil to be emulsified.

2. The process of producing stable emulsions of oils, fats and the like, which consists in heating an acidyl derivative of an aromatic base and an alkali salt of a fatty acid with water and the oil to be emulsified.

3. The process of producing stable emulsions of oils, fats and the like, which consists in heating an acidyl derivative of an aromatic base and a sodium salt of a fatty acid with water and the oil to be emulsified, and adding glycerin thereto.

4. A water-emulsion of oil, fat or the like containing an acidyl derivative of an aromatic base and an alkali salt of a fatty acid.

5. A water-emulsion of oil, fat or the like containing the anilid of stearic acid and the sodium salt of a fatty acid.

In testimony whereof I hereunto affix my signature in the presence of two witnesses.

OSCAR AUGUST HUBERT HUGO KÖSTERS.

Witnesses:
 FERDINAND REICH,
 FREDK. HOYERMANN.